United States Patent
Wiley et al.

(10) Patent No.: US 9,497,710 B2
(45) Date of Patent: Nov. 15, 2016

(54) MULTIPOINT INTERFACE SHORTEST PULSE WIDTH PRIORITY RESOLUTION

(71) Applicant: QUALCOMM Incorporated, San Diego, CA (US)

(72) Inventors: George Alan Wiley, San Diego, CA (US);
(Continued)

(73) Assignee: QUALCOMM Incorporated, San Diego, CA (US)

( * ) Notice: Subject to any disclaimer, the term of this patent is extended or adjusted under 35 U.S.C. 154(b) by 183 days.

(21) Appl. No.: 14/089,550

(22) Filed: Nov. 25, 2013

(65) Prior Publication Data

US 2015/0146624 A1 May 28, 2015

(51) Int. Cl.
*H04W 52/18* (2009.01)
*H04W 88/02* (2009.01)
(Continued)

(52) U.S. Cl.
CPC .......... *H04W 52/18* (2013.01); *H04L 12/4015* (2013.01); *H04L 12/413* (2013.01); *H04W 52/54* (2013.01); *H04W 88/02* (2013.01)

(58) Field of Classification Search
CPC ................ G06F 13/385; G06F 13/4031; G06F 13/362; G06F 13/388; G06F 13/376;
(Continued)

(56) References Cited

U.S. PATENT DOCUMENTS 4,359,731 A * 11/1982 Beauford et al. ............. 370/438
4,670,872 A *  6/1987 Cordill ................. H04L 12/413
370/447

(Continued)

FOREIGN PATENT DOCUMENTS

GB      2232855 A    12/1990
JP     H0823585 A     1/1996
(Continued)

OTHER PUBLICATIONS

International Search Report and Written Opinion—PCT/US2014/066814—ISA/EPO—Feb. 16, 2015.
(Continued)

*Primary Examiner* — Anh-Vu Ly
*Assistant Examiner* — Hector Reyes Ortiz
(74) *Attorney, Agent, or Firm* — Loza & Loza, LLP

(57) ABSTRACT

System, methods and apparatus are described that facilitate transmission of data, particularly between two devices within an electronic apparatus. Each device can contend for control of a communications link by driving a data signal to a first voltage level. If the data signal or a clock signal changes before an arbitration time period has elapsed, one or more devices yield control of the communications link to another contender. The arbitration time period for each contender is different and indicates a priority of the message to be transmitted. A shorter arbitration time period indicates higher priority. Arbitration may commence after clock and data signals of the communications link remain in an idle or other predefined state for a minimum idle time. The minimum idle time may be different for different nodes and may be shorter for high priority messages or nodes.

40 Claims, 10 Drawing Sheets

US 9,497,710 B2
Page 2

(72) Inventors: Olaf Josef Hirsch, Sunnyvale, CA (US); Richard Dominic Wietfeldt, San Diego, CA (US)

(51) Int. Cl.
*H04W 52/54* (2009.01)
*H04L 12/413* (2006.01)
*H04L 12/40* (2006.01)

(58) Field of Classification Search
CPC .................. G06F 13/36; G06F 13/368; G06F 13/372
See application file for complete search history.

(56) References Cited

U.S. PATENT DOCUMENTS

| | | | | |
|---|---|---|---|---|
| 5,555,545 | A * | 9/1996 | Yang | 375/220 |
| 5,710,910 | A * | 1/1998 | Kehl et al. | 713/400 |
| 6,002,669 | A | 12/1999 | White | |
| 6,092,137 | A * | 7/2000 | Huang et al. | 710/111 |
| 6,411,218 | B1 * | 6/2002 | Johnson | 710/107 |
| 6,629,177 | B1 * | 9/2003 | Chong | 710/240 |
| 6,636,914 | B1 * | 10/2003 | Johas Teener | 710/240 |
| 7,143,220 | B2 | 11/2006 | Edirisooriya et al. | |
| 8,209,453 | B2 * | 6/2012 | Kim et al. | 710/113 |
| 8,295,782 | B2 | 10/2012 | Rofougaran | |
| 2008/0183913 | A1 * | 7/2008 | Ryu et al. | 710/25 |
| 2010/0111117 | A1 * | 5/2010 | Kolinummi et al. | 370/503 |
| 2011/0026458 | A1 | 2/2011 | Gruber et al. | |
| 2013/0262761 | A1 * | 10/2013 | Oh | 711/114 |

FOREIGN PATENT DOCUMENTS

| | | |
|---|---|---|
| JP | H09244991 A | 9/1997 |
| JP | 2000250851 A | 9/2000 |
| WO | WO-9909712 A2 | 2/1999 |

OTHER PUBLICATIONS

Schwartz P. U. Ed—Institute of Electrical and Electronics Engineers, "Collision Initiated Bus Arbitration", Proceedings of the National Aerospace and Electronics Conference (NAECON) Dayton, Ohio, May 18-22, 1987, [Proceedings of the National Aerospace and Electronics Conference. (NAECON)], New York, IEEE, US, vol. CONF. 39, May 1, 1987, pp. 126-130, XP000810313.

* cited by examiner

MULTIPOINT INTERFACE SHORTEST PULSE WIDTH PRIORITY RESOLUTION

BACKGROUND

1. Field

The present disclosure relates generally to high-speed data communications interfaces, and more particularly, multipoint data communication links connecting multiple devices.

2. Background

Manufacturers of mobile devices, such as cellular phones, may obtain components of the mobile devices from various sources, including different manufacturers. For example, an application processor in a cellular phone may be obtained from a first manufacturer, while the display for the cellular phone may be obtained from a second manufacturer. The application processor and a display, display driver or other device may be interconnected using a standards-based or proprietary physical interface. One example of a physical interface is the Multipoint Coexistence Management Interface (MP-CxMi), which may be used within a device or components of a device.

A simple network of CxMi nodes associated with modems or other functions may be employed for fully integrated chips and non-integrated devices. The use of a standard interface allows common software to be developed to manage or interact with different devices. CxMi interfaces may use simple complementary metal-oxide-semiconductor (CMOS) signals and run at a data rate of approximately 50 Mbps. However, there is typically no bus master and bus arbitration processes may be prolonged, thereby affecting throughput.

SUMMARY

Embodiments disclosed herein provide systems, methods and apparatus that enable improved transmission rates on physical interfaces between devices within an apparatus. The apparatus may comprise a mobile terminal having multiple Integrated Circuit (IC) devices, which may be collocated in an electronic apparatus and communicatively coupled through one or more data links.

In an aspect of the disclosure, a method for data communications, includes steps of contending for control of a communications link by driving a data signal to a first voltage level, monitoring the data signal and a clock signal for a first period of time, yielding control of the communications link if the voltage of the data signal or the clock signal is not at the first voltage level upon expiration of the first period of time, asserting control over the communications link by driving the data signal to a second voltage level if the voltage of the data signal is at the first voltage level at the expiration of the first period of time, and transmitting a message on the communications after asserting control of the communications link. The duration of the first period of time may correspond to a priority of the message. Control of the communications link may include control of the data signal and/or control of the clock signal.

In an aspect of the disclosure, contending for control of the communications link includes determining that the data signal and a clock signal of the communications link have been idle for a second period of time before driving the data signal to the first voltage level. The second period of time may be calculated based on a priority of the message or a priority associated with a node configured to transmit the message on the communications link. The second period of time may be shorter for higher priorities than for lower priorities.

In an aspect of the disclosure, the first period of time may be defined differently for two or more nodes contending for control of the communications link. The first period of time may be calculated as a multiple of a transmission timing unit defined for timing activities associated with the communications link. The data signal may be driven to the first voltage level for less than one transmission timing unit. The communications link may connect nodes located on different integrated circuit devices. The nodes located on the different integrated circuit devices may operate at different internal clock rates. The transmission timing unit may be equal to or greater than the clock period of a slowest of the internal clocks.

In an aspect of the disclosure, the first period of time is calculated as a weighted sum of the priority of the message and an address of a node configured to transmit the message on the communications link. The first period of time may be shorter for higher priority messages than for lower priority messages. The first period of time may be shorter for higher priority nodes than for lower priority nodes.

In an aspect of the disclosure, monitoring the data signal for the first period of time may include causing a node configured to transmit the message on the communications link to enter a high impedance state.

In an aspect of the disclosure, an apparatus for data communications includes means for contending for control of a communications link by driving a data signal to a first voltage level, means for monitoring the data signal and a clock signal for a first period of time, means for yielding control of the communications link if the voltage of the data signal or the clock signal is not at the first voltage level at the expiration of the first period of time, means for asserting control over the communications link by driving the data signal to a second voltage level if the voltage of the data signal is at the first voltage level at the expiration of the first period of time, and means for transmitting a message on the communications after asserting control of the communications link. The duration of the first period of time may correspond to a priority of the message. The means for contending for control of the communications link may be configured to determine that the data signal and the clock signal have been idle for a second period of time before driving the data signal to the first voltage level.

In an aspect of the disclosure, an apparatus for data communications includes a processing circuit configured to contend for control of a communications link by driving a data signal to a first voltage level, monitor the data signal and a clock signal for a first period of time, yield control of the communications link if the voltage of the data signal or the clock signal is not at the first voltage level at the expiration of the first period of time, assert control over the communications link by driving the data signal to a second voltage level if the voltage of the data signal is at the first voltage level at the expiration of the first period of time, and transmit a message on the communications after asserting control of the communications link. The duration of the first period of time may correspond to a priority of the message. The processor may be configured to determine that the data signal and a clock signal of the communications link have been idle for a second period of time before the data signal is driven to the first voltage level.

In an aspect of the disclosure, a non-transitory machine-readable storage medium has instructions stored thereon, which when executed by at least one processing circuit cause the at least one processing circuit to contend for control of a communications link by driving a data signal to a first voltage level, monitor the data signal and a clock signal for a first period of time, yield control of the communications link if the voltage of the data signal or the clock signal is not at the first voltage level at the expiration of the first period of time, assert control over the communications link by driving the data signal to a second voltage level if the voltage of the data signal is at the first voltage level at the expiration of the first period of time, and transmit a message on the communications after asserting control of the communications link. The duration of the first period of time corresponds to a priority of the message.

DETAILED DESCRIPTION

Various aspects are now described with reference to the drawings. In the following description, for purposes of explanation, numerous specific details are set forth in order to provide a thorough understanding of one or more aspects. It may be evident, however, that such aspects may be practiced without these specific details.

As used in this application, the terms "component," "module," "system" and the like are intended to include a computer-related entity, such as, but not limited to hardware, firmware, a combination of hardware and software, software, or software in execution. For example, a component may be, but is not limited to being, a process running on a processor, a processor, an object, an executable, a thread of execution, a program and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Certain aspects of the invention may be applicable to communications links deployed between electronic devices that may include subcomponents of an apparatus such as a telephone, a mobile computing device, an appliance, automobile electronics, avionics systems, etc.

Figure 1:
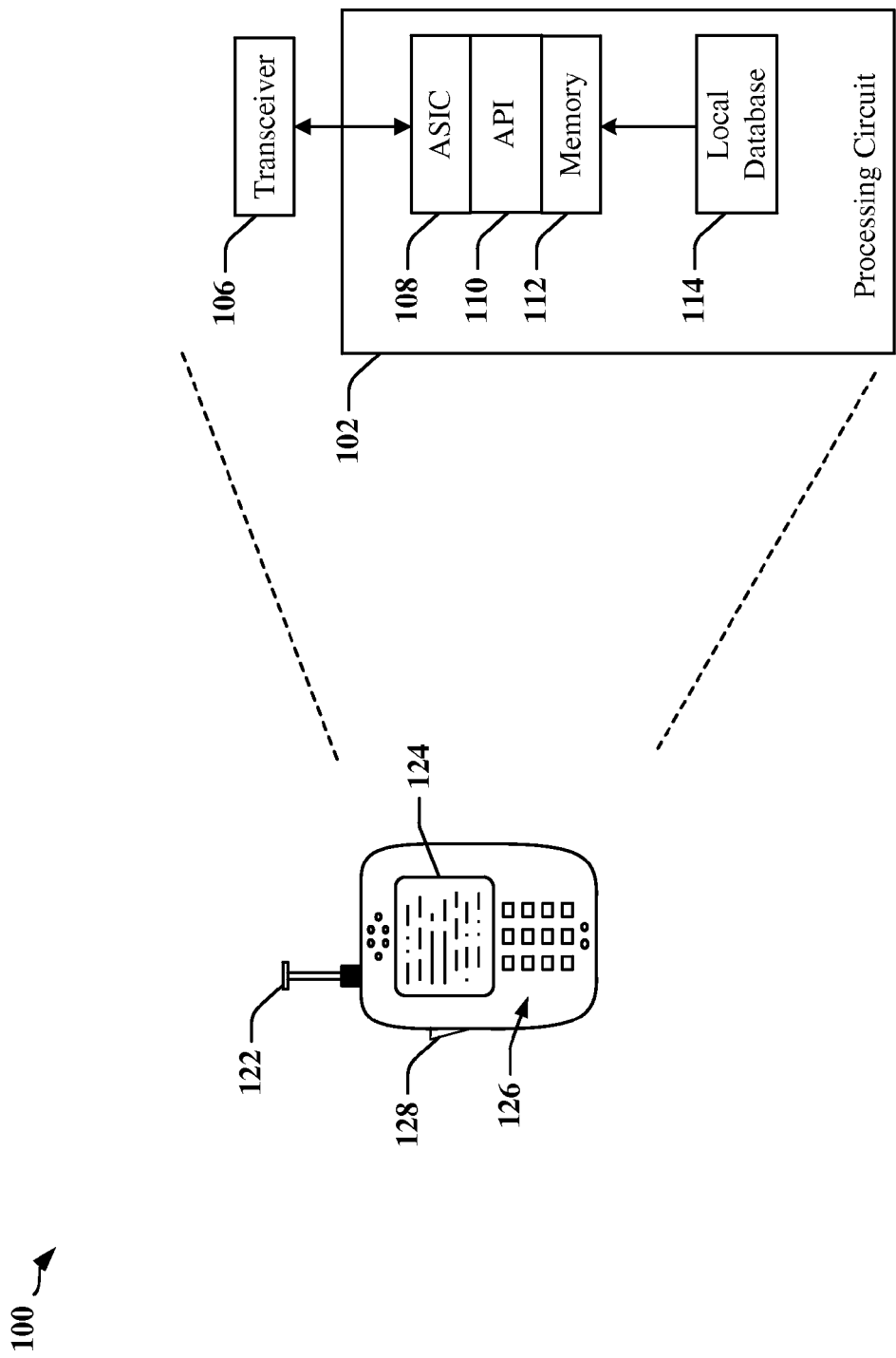
FIG. 1 depicts an apparatus employing a data link between IC devices that selectively operates according to one of plurality of available standards.

FIG. 1 depicts an apparatus 100 that may employ a communication link between IC devices. In one example, the apparatus 100 may comprise a wireless communication device that communicates through an RF transceiver with a radio access network (RAN), a core access network, the Internet and/or another network. The apparatus 100 may include a communications transceiver 106 operably coupled to processing circuit 102. The processing circuit 102 may comprise one or more IC devices, such as an application-specific IC (ASIC) 108. The ASIC 108 may include one or more processing devices, logic circuits, and so on. The processing circuit 102 may include and/or be coupled to processor readable storage such as a memory 112 that may maintain instructions and data the may be executed by the processing circuit 102. The processing circuit 102 may be controlled by one or more of an operating system and an application programming interface (API) 110 layer that supports and enables execution of software modules residing in storage media, such as the memory device 112 of the wireless device. The memory device 112 may include read-only memory (ROM) or random-access memory (RAM), electrically erasable programmable ROM (EEPROM), flash cards, or any memory device that can be used in processing systems and computing platforms. The processing circuit 102 may include or access a local database 114 that can maintain operational parameters and other information used to configure and operate the apparatus 100. The local database 114 may be implemented using one or more of a database module, flash memory, magnetic media, EEPROM, optical media, tape, soft or hard disk, or the like. The processing circuit 102 may also be operably coupled to external devices such as an antenna 122, a display 124, operator controls such as a button 128 and a keypad 126 among other components.

The apparatus 100 may include a plurality of processing circuits 102, transceivers 106, modems and other devices that communicate with one another. Each processing circuit 102 may be implemented as a plurality of IC devices, including one or more ASICs 108, processors, sequencers, state machines, microcontrollers and other logic elements. A variety of different elements, devices, circuits, modules and functions may be adapted to interconnect with one another in order to pass, transfer, route, relay or otherwise communicate data and control information within the apparatus 100. In some instances, the different elements, devices, circuits, modules and functions are clocked at different frequencies and/or are capable of communicating at different data rates. Accordingly, data communications links that interconnect elements, devices, circuits, modules and functions must typically be adaptable to provide access to a variable number of connected elements, devices, circuits, modules and functions.

Figure 2:
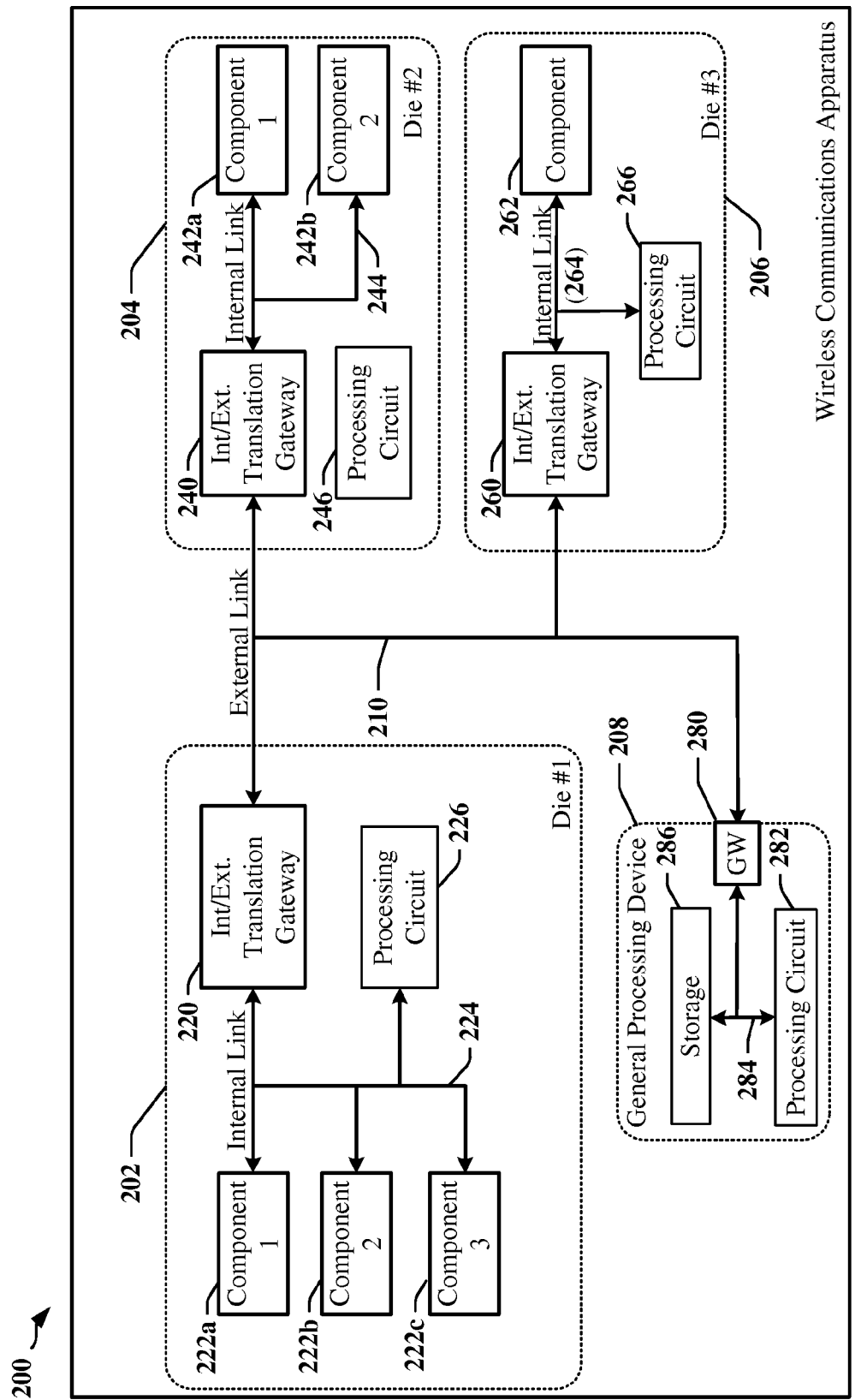
FIG. 2 illustrates an example of a system architecture for an apparatus employing internal and external data links to connect functional components.

FIG. 2 is a block diagram illustrating a simplified example of an apparatus 200 that may operate as wireless communications device. The apparatus 200 includes a plurality of IC devices 202, 204, 206, and 208 which may be formed on individual dice and/or that may be provided on the same or different chip carriers or within the same or different packages. Two or more of the IC devices 202, 204, 206 and/or 208 may exchange data and control information through a communication link 210. The communication link 210 may be used to connect two or more of the IC devices 202, 204, 206, and/or 208 located in close proximity to one another, or physically located in different parts of the apparatus 200. In one example, a communication link 210 may be provided on a chip carrier, substrate or circuit board that carries the IC devices 202, 204, 206, and 208.

The IC devices 202, 204, 206, and 208 may each include functional components that may be configured to communicate with other components of the same IC device 202, 204, 206 or 208, and with components of the other IC devices 202, 204, 206 and/or 208 through the external data link 210. The components within each IC device 202, 204, 206 or 208 may include processing circuits 226, 246, 266 and 282, storage 286, transceivers, modems, UARTs, device drivers, and so on (shown generally as components 222a, 222b, 222c, 242a, 242b and 262). In one example, a general processing device 208 may be provided as an ASIC that includes one or more processing circuits 282 such as a digital signal processor (DSP), microprocessor, microcontroller, sequencer logic, state machines, etc., and support circuits including the storage device 286. In another example, the general processing device 208 may be a memory controller or memory subsystem that provides bulk storage using dynamic random access memory (DRAM) or other storage devices 286 and one or more processing circuits 282. Internal components of the IC devices 202, 204, 206 and 208 may communicate with one another using internal data links 224, 244, 264 and 284, which may include a parallel or serial bus or a communication link configured according to certain aspects disclosed herein.

One or more of the IC devices 202, 204, 206 and/or 208 may have a gateway circuit or component 220, 240, 260 and 280 to provide an interface between internal data links 224, 244, 264 and/or 284 and the external data link 210. In some instances, a gateway 220, 240, 260 or 280 may provide bus translation capabilities that may include parallel-to-serial conversion, serial-to-parallel conversion, data buffering to accommodate clock rate differences, logic level translation, line drivers, and so on. In some example, the gateway 220, 240, 260 or 280 may provide address translation and/or address resolution, including when internal data links 224, 244, 264 and/or 284 and the external data link 210 have a common architecture. In one example, the internal data links 224, 244, 264 and/or 284 and the external data link 210 may include MP-CxMi data links.

Figure 3:
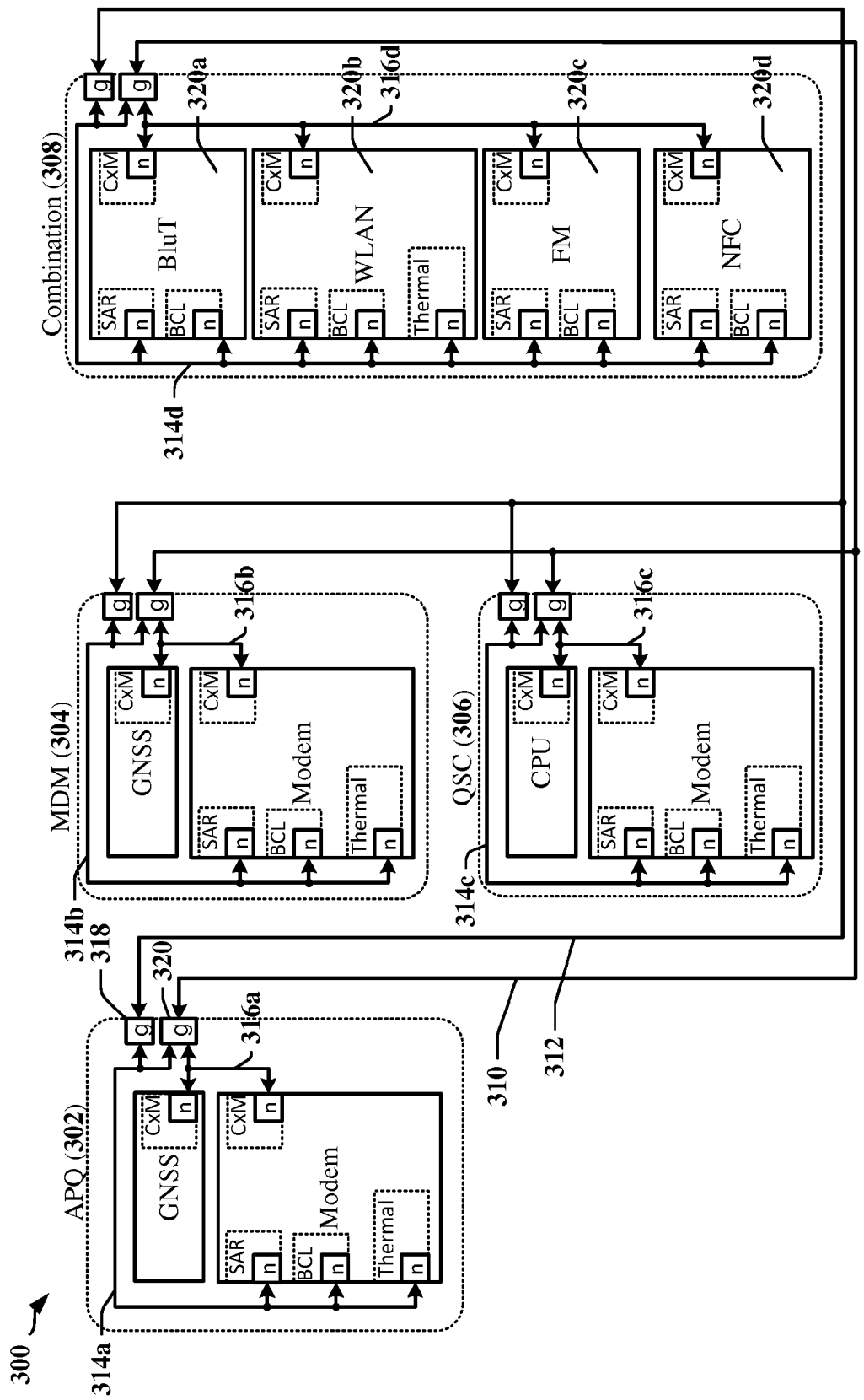
FIG. 3 illustrates an example of a system architecture for an apparatus employing multiple internal and external MP-CxMi communications links.

FIG. 3 is a block diagram illustrating an example of an apparatus 300 that employs two MP-CxMi data links 310, 312 for coexistence management and/or to support limits management (LM) and other functions. In one example, a wireless communications device may provide a first MP-CxMi data link 310 to support communications between a plurality of devices, circuits 302, 304, 306 and 308 and certain functional components thereof (referred to interchangeably herein as "CxMi Nodes"), and a second MP-CxMi communications link 312 that is dedicated for LM functions supported by the IC devices 302, 304, 306 and 308. In one example, the dedicated LM MP-CxMi communications link 312 may connect with a corresponding internal LM MP-CxMi communications link 314a of a first IC device 302 through a dedicated gateway 318. The internal LM MP-CxMi communications link 314s may connect to other CxMi nodes through a gateway 320 that provides access to a primary external MP-CxMi communications link 310. The other CxMi nodes may include one or more nodes of an Access Point Queue (APQ) 302 with global navigation satellite system (GNSS) and LM connections, a modem 304 with GNSS, a single chip combination device 306 for dual-SIM, dual active devices, and a combination device 308 that supports WLAN, Bluetooth, FM and Near Field Communications (NFC) modems.

Various elements, devices, circuits, modules and functions of the apparatus 300 may be interconnected using an MP-CxMi communications link 310, 312, 314a-314d, 316a-316d. One external MP-CxMi communications link 310 may interconnect the IC devices 302, 304, 306 and 308 while internal MP-CxMi communications links 314a-314d and 316a-316d extend the external MP-CxMi communications link 310, 312 to interconnect elements, devices, circuits, modules and functions within corresponding IC devices 302, 304, 306 and 308 respectively.

The resultant MP-CxMi network of CxMi nodes may be configured to support point-to-point (P2P) and multicast communications. The CxMi nodes may be associated with modems or other functions. Each IC device 302, 304, 306 and 308 may support one or more internal CxMi nodes, and the number of CxMi nodes may be based on the number of functions handled by the IC device 302, 304, 306 and 308.

The IC devices 302, 304, 306 and 308 may each comprise a processor or other processing and/or computing circuit or device that can be configured to manage operations of one or more CxMi nodes. In some instances, one or more CxMi nodes may be controlled by a sequencer or state machine.

An MP-CxMi communications system may be used with fully integrated and non-integrated IC devices 302, 304, 306 and 308, and a common host controller interface (HCI) may be defined for the apparatus 300. Accordingly, higher level software may be used to control the apparatus 300. A common interface software may be used regardless of the combination of types of modems/transceivers that may be deployed within the apparatus 300. For example, the apparatus 300 may include the GSM and/or LTE modems, as well as a wireless local area network (WLAN) transceiver 320b, a Bluetooth transceiver 320a, and other end-point modems or transceivers 320c, 320d may be integrated and respond to the common HCI through the MP-CxMi communications link 310, 312, 314a-314d and/or 316a-316d.

In certain examples, the external MP-CxMi communications link 310 or 312 may operate using simple CMOS signals, without a requirement for special physical layer drivers and other devices. The external MP-CxMi communications link 310 or 312 may be configured to carry data at a data rate of 50 megabits per second (Mbps) or more. The MP-CxMi communications link 310 or 312 may be flexibly designed, and the data rate may be determined by a transmitting CxMi node. Delay and hold-off parameters may also be flexibly configured and, in one example, may be configured by parameters maintained by configuration registers.

In one mode of operation, a transmitting CxMi node sources the transmit clock. No predefined bus master is employed and the transmitting CxMi node may control or master the bus for the duration of a message transmission. Contention resolution is performed before every message is transmitted, whereby only those CxMi Nodes that wish to transmit on the bus participate in the contention resolution at the time of transmission of a message participate in contention resolution.

Each CxMi node has a unique address, which can be programmed or configured through an HCI register. Each CxMi node can direct a message to one other node in a P2P mode, or multicast a message to all nodes in a point-to-multi-point (P2MP) mode. P2MP transmissions may be facilitated using multicast addresses and many different multicast addresses can be defined in order to define subnets within the network of CxMi Nodes. In one example, coexistence elements may be assigned one subnet, sensors to another subnet, and thermal management elements to another subnet, etc. The various subnets may be connected or coupled through the same two wires of the external MP-CxMi communications link 310 or 312 and, within each IC device 302, 304, 306 or 308, on a corresponding internal MP-CxMi communications link 314a-314d or 316a-316d. Accordingly, communications between all IC devices and subnets may be effected using the same two wires between IC devices 302, 304, 306 and/or 308.

Each IC device 302, 304, 306 or 308 may have a processor or other processing and/or computing circuit or device, and storage media including transitory and/or non-transitory storage devices that may be adapted to maintain instructions and data used by respective processors on the IC devices 302, 304, 306 and/or 308, and/or other components of the IC devices 302, 304 and 306.

Figure 4:
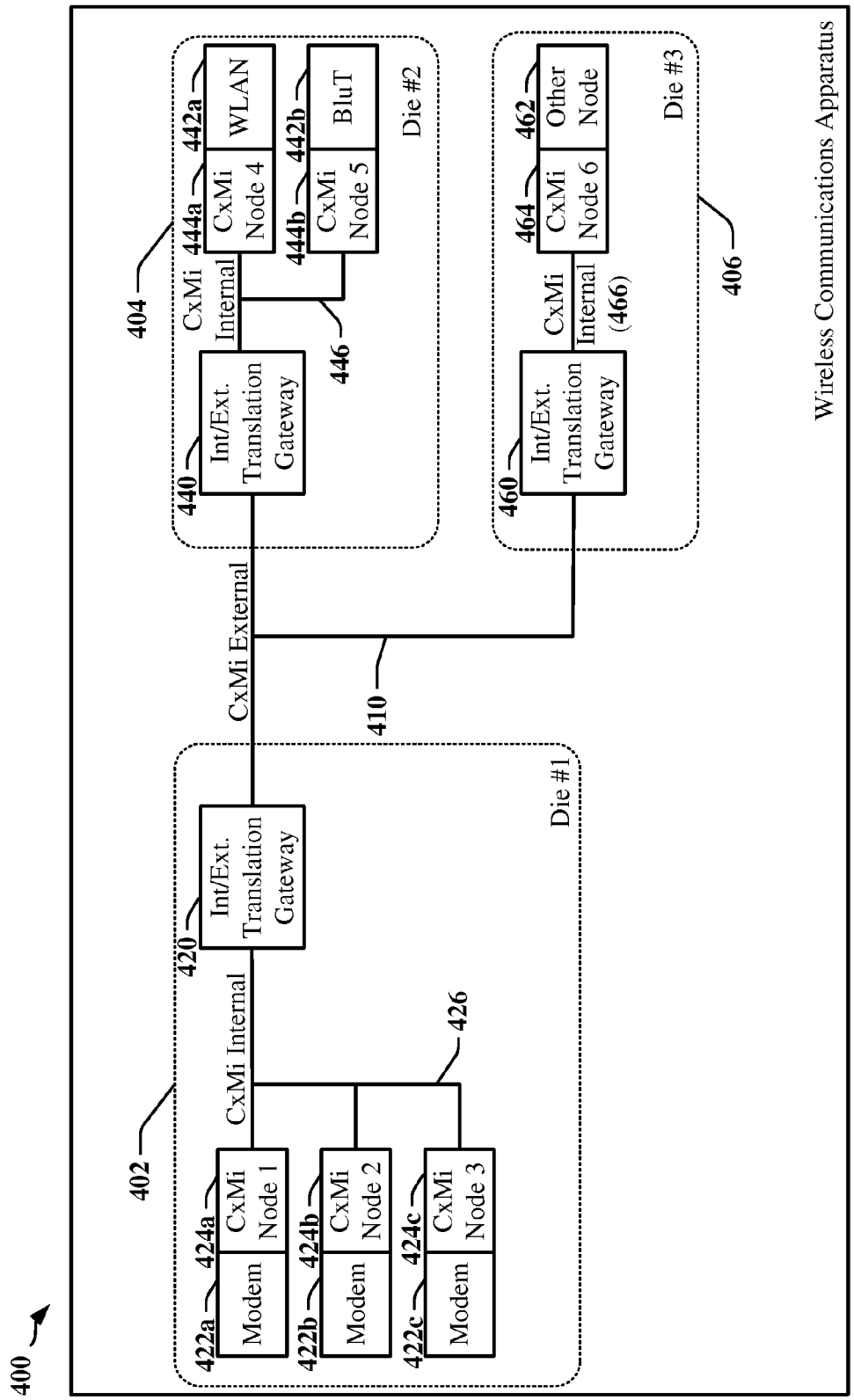
FIG. 4 illustrates a simplified example of an apparatus with an external MP-CxMi communications link that connects devices with internal MP-CxMi communications links.

FIG. 4 is a block diagram showing a simplified apparatus 400 that employs MP-CxMi to connect a plurality of IC devices 402, 404 and 406 and to connect functional elements or components 420, 422a, 442b, 422c, 440, 442a, 442b, 460 and 462 within the IC devices 402, 404, 406. Each of the illustrated IC devices 402, 404, 406 includes a gateway 420, 440, 460 that provides various translation services enabling the functional elements or components 420, 422a, 442b, 422c, 440, 442a, 442b, 460 and 462 to interconnect and communicate through the internal MP-CxMi data links 426, 446, 466 and through the external MP-CxMi data link 410. The gateways 420, 440, 460 may provide level translation, buffering and clock rate conversion services. Each MP-CxMi data link 410, 426, 446, 466 typically carries both data and clock signals. Each internal component 422a, 422b, 422c, 442a, 442b and 462 may be connected to respective internal CxMi data links 426, 446 and 466 through an interface (CxMi Node) 424a, 424b, 424c, 444a, 444b and 464 respectively.

Gateways 420, 440 and/or 460 and nodes 424a, 424b, 424c, 444a, 444b and/or 464 may be controlled by one or more state machines or other controllers or sequencers. The state machines can efficiently send simple real-time events with low latency. State machines may be communicatively coupled to a node-associated modem or to a communication processor configured for sending messages.

Certain operational aspects of the apparatus 400 are now described in relation to FIGS. 5-8.

Figure 5:
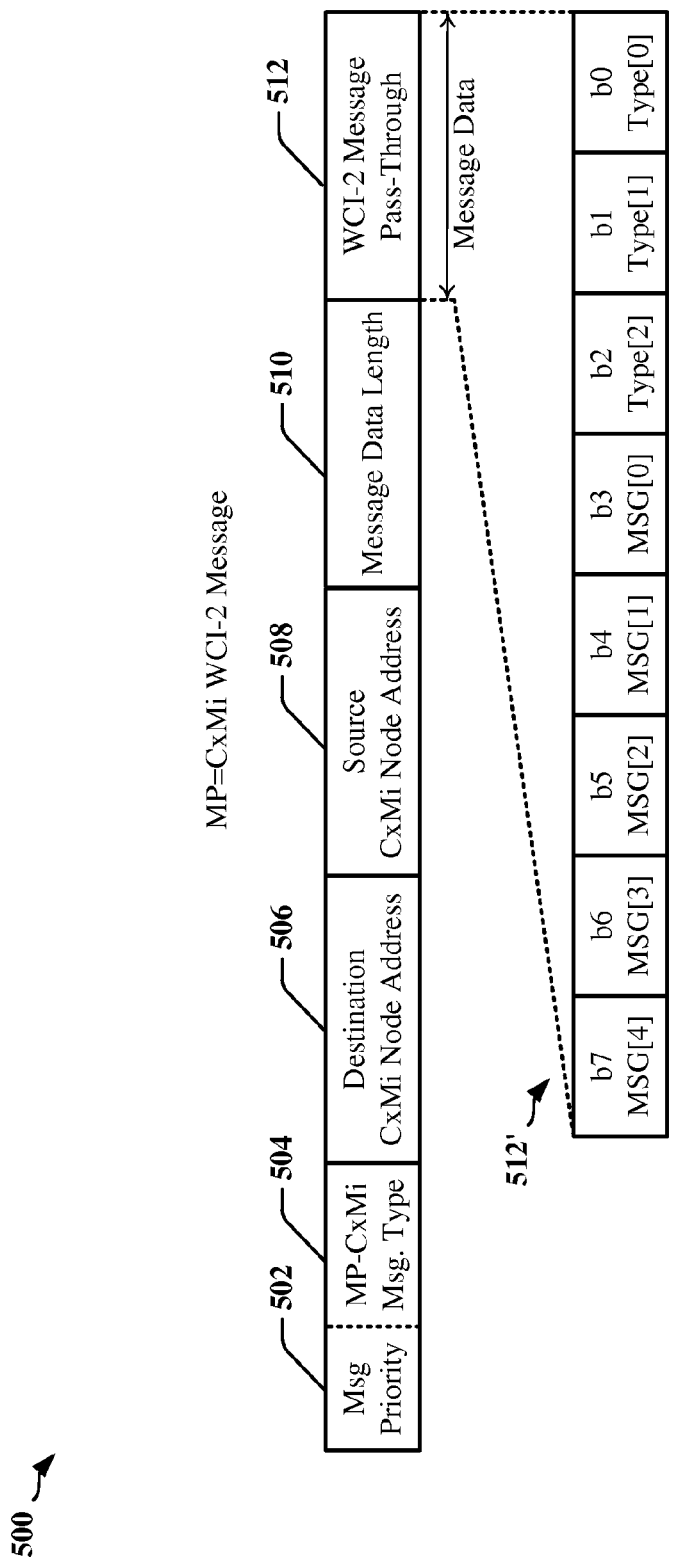
FIG. 5 illustrates an example format of a message that may be transmitted on a multipoint MP-CxMi communications link.

FIG. 5 illustrates certain elements of a message 500 that may be used on MP-CxMi communications links 410, 426, 446 and/or 466. Messages may include Wireless Coexistence Interface (WCI-2) messages 512 that may be effectively tunneled by the MP-CxMi protocol. WCI-2 messages 512 may be transmitted through a multi-point MP-CxMi network 410, 426, 446 and/or 466, and the messages may be addressed to specific nodes 424a, 424b, 424c, 444a, 444b and 464 or to a group of nodes on a subnet. A message can contain up to 255 bytes following a small header. Included in the header is a Message Type field 504 that may be are used to identify the higher-level protocol of the message data being tunneled in the MP-CxMi Message 500. In one example, the protocol can support up to 32 different message types including standardized and proprietary data types, where each is associated with a different Message Type value.

A message priority may be defined that enables higher-priority real-time messages to be sent first when multiple nodes attempt to send messages simultaneously. The message priority field 502 may include a 3-bit priority value that is sent in every message 500. In one example, lower priority values correspond to higher priorities, such that a "0" priority value is associated with the highest available priority and/or the most urgent priority while a priority value of "7" is the lowest and least urgent priority. A system designer may choose appropriate priorities for each message type to ensure efficient delivery of messages that correspond to real-time events. For example: Type-0 WCI-2 messages 512 may be assigned the highest priority and Type-2 WCI-2 messages 512 may be assigned the lowest priority. A system designer may use less than the 8 available priority levels provided by a 3-bit priority field 502 and/or may to utilize a small subset of priority levels to reduce the overhead of the arbitration phase on the external MP-CxMi bus 410.

The priority of each message type can be set in various ways. For simplicity of description, it will be assumed that the node receives a 3-bit priority field 502 from the device-side of the node interface circuits in parallel with receiving the message data to be sent.

According to certain aspects disclosed herein, a shortest pulse width method may be used to arbitrate access to an external MP-CxMi bus 410 when multiple devices 402, 404 and 406 are connected to the MP-CxMi bus 410. Priority for the plurality of devices 402, 404 and/or 406 wishing to transmit at the same time may be resolved when the higher priority messages are identified by the shortest assert pulse. Using shorter pulses for higher-priority messages can reduce the overhead for high-priority messages. In some instances, the actual digital content of the message priority field 502 is transmitted only on an internal CxMi bus 426, 446 and/or 466, and not on the external MP-CxMi bus 410. When a message is to be transmitted on the external bus 410, the message priority 502 may be converted to an assert pulse width in an arbitration phase, because this field is no longer needed after the message 500 passes through the external bus to the receiving gateways 420, 440 and/or 460.

In one example, a first CxMi Node 424a, 424b, 424c, 444a, 444b or 464 with an address set to "3" may transmit a P2P message to a second CxMi Node 424a, 424b, 424c, 444a, 444b or 464 that has an address set to "5". The message destination address field 506 may be set to "5," and the source address field 508 may be set to "3." When the CxMi node 424a, 424b, 424c, 444a, 444b or 464 sends the message 500, it is routed through a gateway 420, 440 and/or 460, the external MP-CxMi bus 410 and corresponding internal MP-CxMi busses 426, 446 and/or 466 such that all receiving nodes 424a, 424b, 424c, 444a, 444b and/or 464 can see the message 500.

A pulse-width-based contention resolution scheme in accordance with one or more aspects disclosed herein can resolve priority on the external MP-CxMi bus 410. Each node (i.e. gateways 420, 440 and/or 460) contending for control of the external MP-CxMi bus 410 performs a "level set and monitor" procedure to determine whether a higher priority node 420, 440 or 460 has taken control of the bus 410. The I/O pad circuit for coupling MP-CxMi signals to the external MP-CxMi bus 410 may include a standard CMOS I/O pad circuit with high-impedance capability. A keeper circuit (see FIG. 8) may be configured to maintain the state of the bus 410 at a data high state or at a data low state when all data driver circuits, including contending nodes 420, 440 and/or 460, are in the high-impedance state. The clock signal of the external MP-CxMi bus 410 may be configured with a pull-down current source that holds the clock in a low state when no device is driving the clock, including during the contention process.

Figure 6:
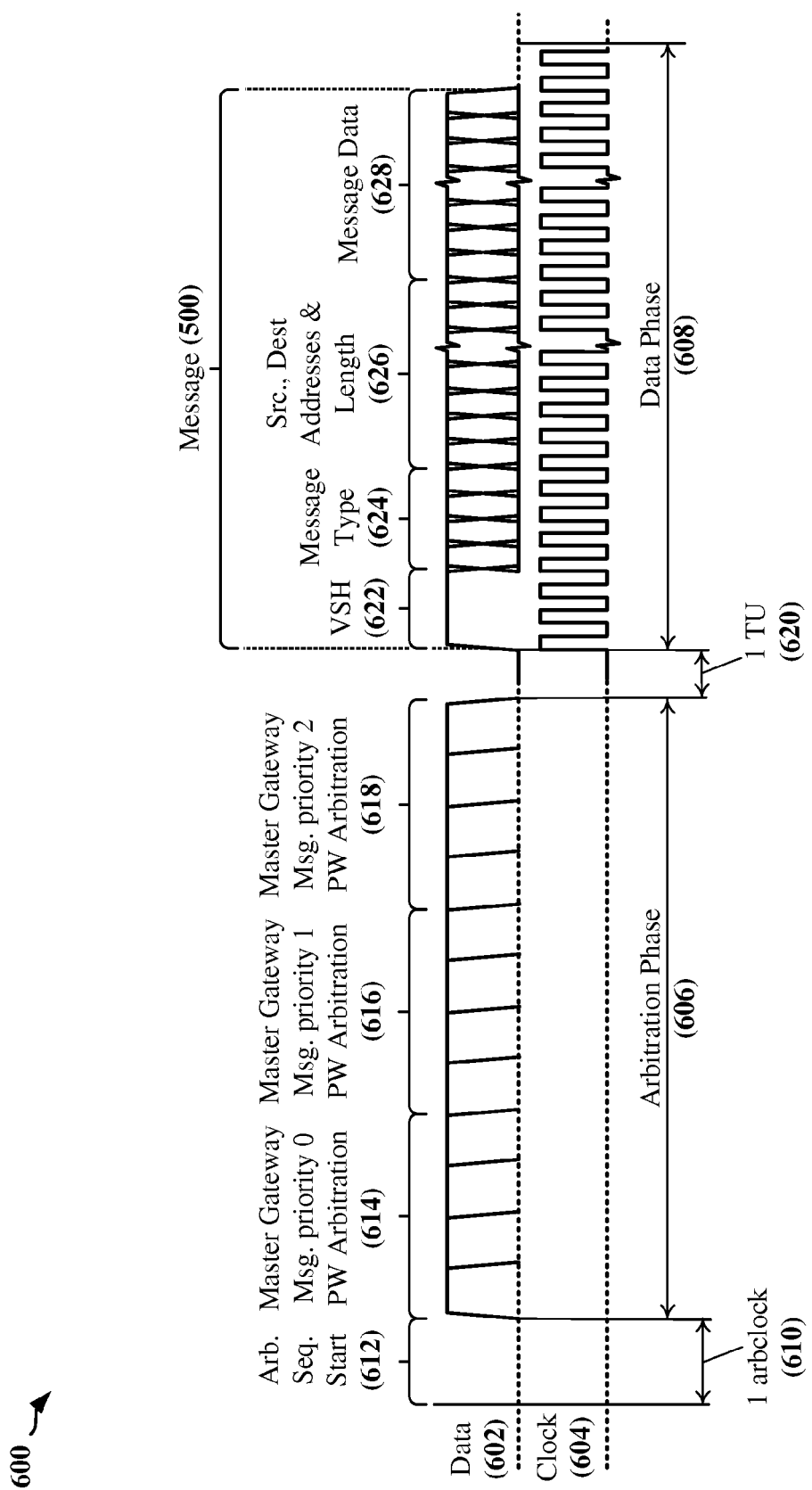
FIG. 6 is a timing diagram illustrating transmission of a message transmitted on a MP-CxMi communications link.

FIG. 6 is a timing diagram 600 illustrating the transmission of an MP-CxMi message, such as the message 500 illustrated in FIG. 5. The message 500 may be transmitted during a data phase 608 on one or more of the MP-CxMi communications links 410, 426, 446 and/or 466. The message 500 may be transmitted as data 602 on a pair of connectors using a clock 604 provided by the transmitter. In order to transmit the message 500 in the data phase 608, the transmitter attempts to gain control of the necessary MP-CxMi communications links 410, 426, 446 and/or 466 during an arbitration phase 606. According to certain aspects disclosed herein, control of the MP-CxMi communications link 410 is acquired during the arbitration phase 606 using a protocol based on timing of signals.

The arbitration phase 606 can resolve message priority for messages 500 to be sent over the MP-CxMi communications bus 410 by a plurality of CxMi nodes 424a, 424b, 424c, 444a, 444b and/or 464 contending for control of the necessary MP-CxMi communications links 410, 426, 446 and/or 466 using an arbitration process that ensures that the highest priority message is transmitted first. Priority may be resolved based on timing generated from a combination of the content or value of the Message Priority field 502 of the message 500 and a gateway address assigned to a transmitting gateway 420, 440 or 460. In one example, a relatively simple algorithm applied to the numerical gateway address and message priority variables may generate a calculated priority value that determines the priority of the message 500.

The highest calculated priority value may determine which contending CxMi node 424a, 424b, 424c, 444a, 444b or 464 wins the arbitration for the MP-CxMi communications links 410, 426, 446 and/or 466. A CxMi node 424a, 424b, 424c, 444a, 444b or 464 that wins the arbitration for the MP-CxMi communications links 410, 426, 446 and/or 466 can control access to the external MP-CxMi communications link 410 and/or one or more of the internal MP-CxMi communications links 426, 446 and/or 466. The Node Source Address 508 may be used to break a tie when two or more messages have the same calculated priority value.

CxMi messages 500 may be transmitted during the data phase 608. In the example illustrated in FIG. 5, the fields of a CxMi message 500 include a Very Short Header (VSH) field 622, which may be synthesized by the CxMi gateway 420, 440 or 460 for data compression over the external MP-CxMi communications link 410. The VSH field 622 is typically transmitted first. In one example, if the VSH field 622 has a value from 0 to 6, then the Message Type field 504, Destination Node Address field 506, Source Node Address field 508, and Message Data Length field 510 need not be transmitted, because these fields can be obtained from one of 7 sets of registers in the HCI. However, if the VSH field 622 has a value of 7, then a Message Type field 504 is transmitted in the next field 624 of the data phase 608, followed by fields 626 including Destination Node Address field 506, Source Node Address field 508, and Message Data Length field 510. The lengths of message header fields for the Message Type field 504, Destination Node Address field 506, Source Node Address field 508, and Message Data Length field 510 are typically specified by registers in the HCI.

When the transmitted VSH field 622 has a value of 7, optional fields 626 include the Message Type field 504, Destination Node Address field 506, Source Node Address field 508 and the Message Data Length field 510.

The Message Type field 504 identifies the type of message or the protocol that is tunneled through the MP-CxMi interface.

The Destination Node Address field 506 specifies the Node Address of the CxMi Node 424a, 424b, 424c, 444a, 444b and/or 464 that is the intended recipient of the message. The address may also be a multicast address that causes multiple CxMi Nodes 424a, 424b, 424c, 444a, 444b and/or 464 to receive the message 500.

The Source Node Address field 508 includes the Node Address of the CxMi Node 424a, 424b, 424c, 444a, 444b or 464 from which the message originated.

The Message Data Length field 510 includes the number of bytes of Message Data 628 that follow. The Message Data includes the payload of the message 500.

Messages 500 are sent over the external MP-CxMi bus 410 after a contending CxMi Node 424a, 424b, 424c, 444a, 444b or 464 has acquired control of the external MP-CxMi bus 410 by winning a bus arbitration process that precedes each transmission of an MP-CxMi message 500. Each CxMi gateway 420, 440 and/or 460 that has a message 500 to be transmitted may participate in bus arbitration. Any CxMi gateway 420, 440 and/or 460 that has no CxMi message 500 to send may ignore the bus activity and enter or remain in sleep mode. A CxMi gateway 420, 440 and/or 460 may monitor bus activity to determine when transmission of the current CxMi message 500 is complete, particularly when the monitoring CxMi Node 424a, 424b, 424c, 444a, 444b or 464 has or receives a message 500 to send.

A contending CxMi Node 424a, 424b, 424c, 444a, 444b and/or 464 that does not win the arbitration process may enter a sleep mode. In the sleep mode, the CxMi Node 424a, 424b, 424c, 444a, 444b and/or 464 can receive messages. The receiver can determine whether a message is addressed to it when the logic is powered-on, even if the logic is clocked only by a CxMi interface clock where, for example, an internal clock is disabled to conserve power. In some instances, a CxMi Node 424a, 424b, 424c, 444a, 444b and/or 464 may be configured to exit sleep mode upon receipt of any message. In some instances, a CxMi Node 424a, 424b, 424c, 444a, 444b and/or 464 may be configured to exit sleep mode upon receipt of certain predetermined wakeup messages. A message that causes a CxMi Node 424a, 424b, 424c, 444a, 444b and/or 464 to exit sleep mode may carry additional data that the CxMi Node 424a, 424b, 424c, 444a, 444b and/or 464 can evaluate after waking up.

Figure 7:
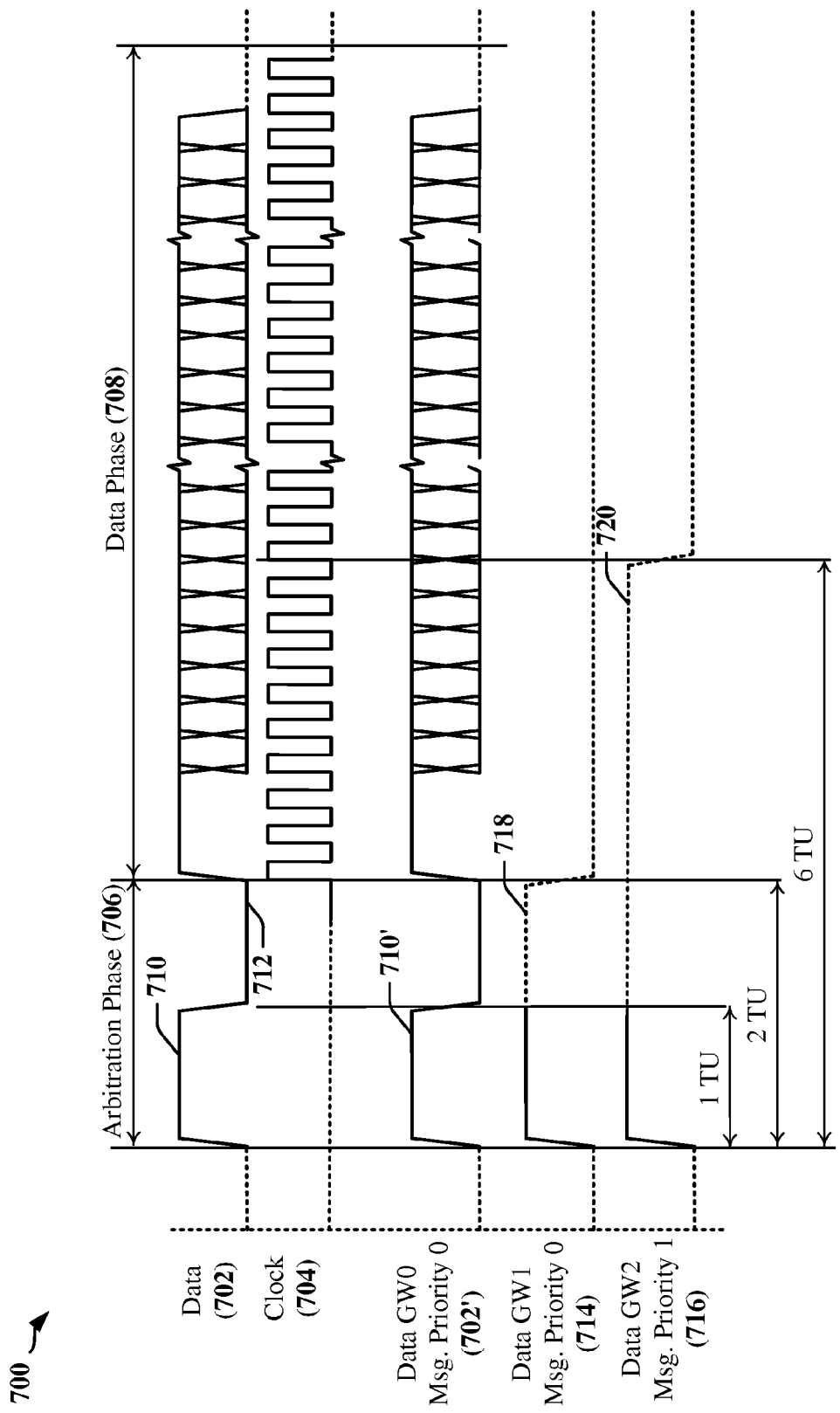
FIG. 7 is a timing diagram illustrating one example of MP-CxMi bus arbitration according to certain aspects disclosed herein.
Figure 8:
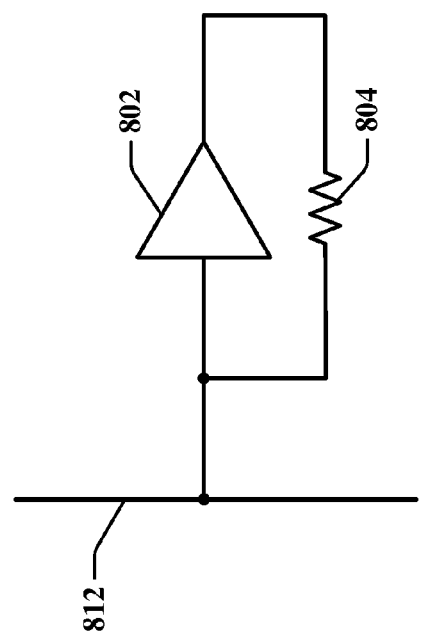
FIG. 8 illustrates a keeper circuit according to certain aspects disclosed herein.

FIG. 7 is a timing diagram illustrating one example of a bus arbitration process 700 between three CxMi gateways 420, 440 and 460. An arbitration process 700 may be initiated after the data signal 702 and/or the clock signal 704 remain idle for a predefined time, typically measured as a multiple of arbitration clock cycles. In the depicted example 700, the idle state may be defined as a logic low level. A unit of time based on the arbitration clock cycle may be referred to as a transmission unit (TU). The TU is typically selected to accommodate a slowest clock rate of connected devices, such as the IC devices 402, 404 and 406 (see FIG. 4), which may operate at different clock speeds. Typically, the TU is an integer multiple of the slowest clock rate of connected devices, and this arbitration clock timing enables pulse widths transmitted by contending CxMi gateways 420, 440 and 460 to be of consistent lengths during arbitration.

The period of time during which the data signal 702 and the clock signal 704 remains low (or in another idle state) prior to an arbitration process 700 can be variable. In one example, a plurality of contending CxMi gateways 420, 440 and/or 460 may be configured to initiate the arbitration process 700 after observing the idle state on the data signal 702 and the clock signal 704 for different periods of time. The CxMi gateways 420, 440 and/or 460 may be assigned different priorities and higher priority CxMi gateways 420, 440 and/or 460 may initiate the arbitration process 700 before lower priority CxMi gateways 420, 440 and/or 460, thereby preempting the lower priority CxMi gateways 420, 440 and/or 460. In another example, the CxMi gateways 420, 440 and/or 460 may be configured to initiate the arbitration process 700 after observing the idle state on the data signal 702 and the clock signal 704 for a period of time determined based on the priority of a message 500 to be transmitted. In this manner, a message 500 with lower priority can have a longer monitor period than a message 500 with higher priority.

In the example depicted in FIG. 7, each of the contending CxMi gateways 420, 440 and 460 participates in an arbitration process 700. The CxMi gateways 420, 440 and 460 may enter contention arbitration after determining that the data signal 702 and the clock signal 704 have remained idle for two or more TUs. Arbitration begins when at least one of the contending CxMi gateways 420, 440 and 460 drives the data signal 702 high to contend for control of the MP-CxMi communications link 410. Some or all of the contending CxMi gateways 420, 440 and 460 may simultaneously and/or concurrently drive the data signal 702 high to assert their respective contention for control of the MP-CxMi communications link 410. Each participating CxMi gateway 402, 404 and 406 then waits for a period of time determined by calculating a priority value for its corresponding message 500 before driving the data signal 702 low. If the data signal 702 is already low after the period of time, then the corresponding CxMi gateway 420, 440 and/or 460 yields control of the MP-CxMi communications link 410 to a higher priority transmitter of a CxMi message 500.

The period of time that a CxMi gateway 402, 404 and 406 waits before driving the data signal 702 low may be determined using an algorithm to calculate a width of an arbitration pulse 710, 718 or 720. In the depicted example 700, the algorithm calculates the duration t of the arbitration pulse 710, 718 or 720 as:

$$t = TU * ((\text{Message\_Priority} * N_{Gateways}) + (\text{Gateway\_Address} + 1)),$$

where $N_{Gateways}$ is the number of CxMi gateways 420, 440 and 460 connected to the MP-CxMi communications link 410. The weighting in this algorithm emphasizes message priority over gateway address. However, gateway address can serve as a tiebreaker between messages 500 that have the same message priority. For example, when two messages 500 from different CxMi gateways 420, 440 and/or 460 have the same message priority, the message 500 sent from the CxMi gateway 420, 440 or 460 that has the lowest gateway address may prevail in the arbitration process 700 because it generates the shortest of the arbitration pulses 710, 718 or 720.

The depicted arbitration process 700 relates to an example of arbitration between three CxMi gateways 420, 440 and 460 ($N_{Gateways}=3$), which have messages to be transmitted, where:

A first gateway 420 has gateway address=0, a message with Message Priority 0 and generates an assert pulse with duration $t_1=(0*3)+(0+1)=1$ TU;

A second gateway 440 has gateway address=1, a message with Message Priority 0 and generates an assert pulse with duration $t_2=(0*3)+(1+1)=2$ TU; and A third gateway 460 has gateway address=2, a message with Message Priority 1, and generates an assert pulse with duration $t_3=(1*3)+(2+1)=6$ TU.

The depicted arbitration process 700 begins after the data signal 702 and clock signal 704 are pulled low for a predetermined period of time. During this "idle" period, all CxMi gateways 420, 440 and 460 are typically in a high-impedance state and no bus master is defined. The data signal 702 and the clock signal 704 may be maintained by respective keeper circuits 800 (see FIG. 8) when all CxMi gateways 420, 440 and 460 enter the high-impedance state. In one example, the three CxMi gateways 420, 440 and 460 may be configured to remain in the high-impedance state and observe the data signal at the idle state (e.g. low level) for at least 2 TU. In another example, the three CxMi gateways 420, 440 and 460 may be configured to remain in the high-impedance state and observe the data signal at the idle state (e.g. low level) for different or variable periods of time. The CxMi gateways 420, 440 and 460 may simultaneously and/or concurrently drive the data signal 702 high to contend for control of the MP-CxMi communications link 410. The first CxMi gateway 420 pulls the data signal 702 low after a 1 TU period has elapsed. The second and third CxMi gateways 440 and 460 detect that the data signal 702 has been driven low and remain in the high-impedance state until the beginning of the next arbitration phase 706. The dashed lines on the data waveforms 714 and 716 of the second and third CxMi gateways 440 and 460 indicate the form of pulses 718 and 720 that would have been generated if no higher priority message is determined to be available for transmission. The first CxMi gateway 420 typically does not drive the clock signal until it has completed bus acquisition, which may occur after a delay of 1 TU or more.

According to certain aspects disclosed herein, the arbitration assert pulse 710 is initiated by one or more of the CxMi gateways 420, 440 and/or 460 and is terminated by the CxMi gateway 420, 440 or 460 that has the shortest calculated arbitration assert pulse 710, 718 or 720. In the example shown in FIG. 7, the first CxMi gateway 420 generates the waveform 702' that has the shortest arbitration assert pulse 710', and continues to drive the data signal 702 low for 1 TU 712 before entering the data phase 708. The first CxMi gateway 420 then sends a VSH field of the CxMi Message 500. In each arbitration process 700, the total elapsed time of the arbitration phase 706 is variable, and its length is governed by the Message Priority and the Gateway Address associated with the message 500 that prevails in the arbitration process.

Second and third CxMi gateways 440 and 460 may be contending to send a lower priority message at the same time that the first CxMi gateway 420 wishes to send a higher priority message. The second CxMi gateway 440 may initiate a pulse 718 and the third CxMi gateway 460 may initiate a pulse 720 on the external MP-CxMi communications link 410. The second and third CxMi gateways 440 and 460 may then observe the data signal 702 until the time period of its respective pulse 718 or 720 is to expire. However, in the example, the data signal 702 is first driven low by the higher priority first CxMi gateway 420, depriving the second CxMi gateway 440 and the third CxMi gateway 460 of the opportunity to switch the data signal 702 from a high level to a low level and precluding the second CxMi gateway 440 from acquiring control of the bus 410. Having observed that the first CxMi gateway 420 has driven the data signal 702 low before the time when the lower priority second CxMi gateway 440 and third CxMi gateway 460 would have attempted to drive the data signal 702 low, the second CxMi gateway 440 and the third CxMi gateway 460 remain in high-impedance state and monitor the transmission by the first CxMi gateway 720 and, subsequently the idle states of the data signal 702 and clock signal 704 to determine when the next contention process can begin.

For each CxMi gateway 420, 440 and 460, the duration of one TU may be determined using a clock divider configured or programmed to divide an internal clock. The internal clock and the clock divider may be configured through a gateway configuration register in the Gateway HCI. A TU is typically selected to have a duration that can be generated by the slowest available clock of all CxMi gateways 420, 440 and/or 460 in the apparatus 400. A fractional divider may be used provided the peak-to-peak variation of the synthesized clock produces a period of sufficient accuracy, and if the sampling window for detecting pulses from other CxMi gateways 420, 440 and/or 460 is sufficiently accurate.

According to certain aspects disclosed herein, the contending CxMi gateways 420, 440 and/or 460 drive the data signal 702 high and enter a high-impedance state within 0.5 TU. In order to maintain the state of the undriven data signal 702 and/or the undriven clock signal 704, one or more keeper circuits 800 (FIG. 8) may be provided. A keeper circuit 800 may be deployed internally on an IC device 402, 404, 406, or externally to maintain the data signal condition when all CxMi gateways 420, 440 and 460 have entered high impedance mode. During arbitration, the keeper circuit 800 holds a signal line 812 high until the CxMi gateway 420, 440 or 460 serving the highest priority event drives the signal line 812 low, thus producing the shortest pulse. In the illustrated example, the keeper circuit 800 may include a non-inverting gate 802 with a high impedance feedback resistor 804 that maintains the data signal in its last driven state. The resistor 804 has a sufficiently high resistance that it adds negligible load to the signal line 812 and is easily overcome by an active CxMi gateway output.

At the end of the period of the shortest pulse, the CxMi gateway 420, 440 or 460 associated with the shortest pulse exits the high-impedance state and drives the signal line 812. For example, the CxMi gateway 420, 440 or 460 that wins the arbitration process 700 drives the data signal 702 low for 0.5 TU and drives the clock signal 704 after the termination of the arbitration phase 706. Contending CxMi gateways 420, 440 and/or 460 with lower priority messages to send may detect that the data signal 704 has been driven low, and exit the arbitration process 700. The CxMi gateways 420, 440 and/or 460 that do not prevail in the arbitration process 700 typically maintain their data outputs in a high-impedance state until after the winning message is transmitted. By driving the bus only when a signal transition is needed, it is possible for the CxMi gateways 420, 440 or 460 with the most urgent message to drive a shorter pulse on the data signal line 702 than the pulse driven by the other CxMi gateways 420, 440 and/or 460.

Figure 9:
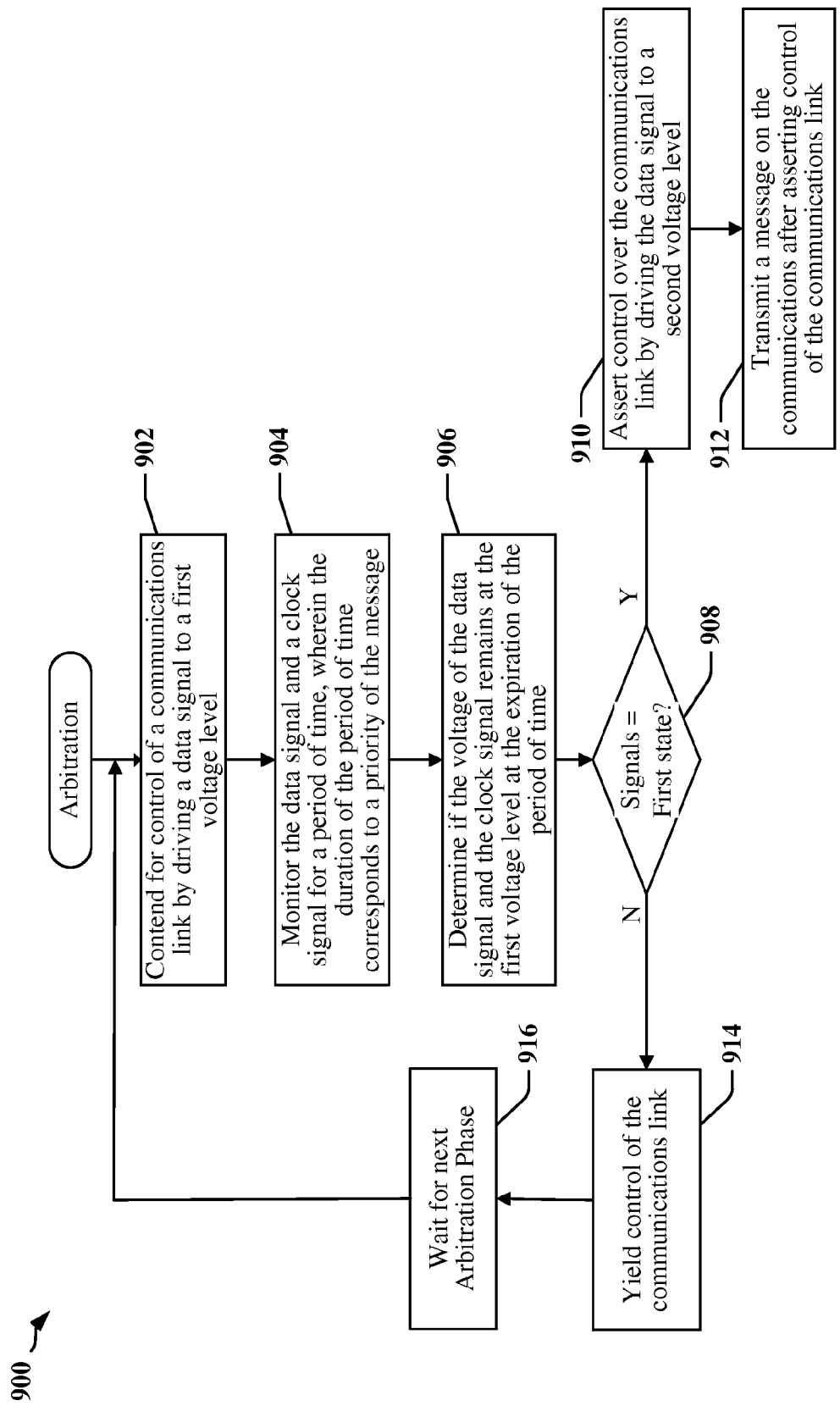
FIG. 9 is a flow chart of a method for communicating between nodes connected to an MP-CxMi bus according to certain aspects disclosed herein.

FIG. 9 is a flow chart 900 of a method for communicating between nodes connected to a CxMi bus 410. The method may be performed in an IC device 402, 404 or 406 coupled to a communications link, which may be the CxMi bus 410. At step 902, the IC device 402, 404 or 406 may contend for control of a communications link by driving a data signal to a first voltage level.

At step 904, the IC device 402, 404 or 406 may monitor the data signal and a clock signal for a first period of time. The duration of the first period of time corresponds to a priority of the message. The first period of time may be defined differently for two or more nodes contending for control of the communications link. The first period of time may be calculated as a multiple of a transmission timing unit defined for timing activities associated with the communications link. The data signal may be driven to the first voltage level for less than one transmission timing unit. The communications link may be adapted to connect nodes located on different IC devices. The nodes located on the different IC devices operate at different internal clock rates. The transmission timing unit may be equal to, or greater than the clock period of a slowest of the internal clocks used by the different IC devices. The first period of time may be calculated as a weighted sum of the priority of the message and an address of a node configured to transmit the message on the communications link. The first period of time may be shorter for higher priority messages or higher priority nodes.

In an aspect of the disclosure, a node configured to transmit the message on the communications link may be caused to enter a high impedance state while the data signal is monitored for the first period of time.

In an aspect of the disclosure, contending for control of the communications link may include determining that the data signal and a clock signal of the communications link have been idle for a second period of time before driving the data signal to the first voltage level. For example, one or more nodes in the IC devices 402, 404 and/or 406 that have a message to be transmitted may wait until the clock and data signals are idle, driven low or driven high, etc. for the duration of the second period of time. The second period of time may be calculated based on a priority of the message or a priority associated with a node configured to transmit the message on the communications link. The second period of time may be shorter for higher priority nodes and/or higher priority messages.

At step 906, the IC device 402, 404 or 406 may determine if the voltage of the data signal or the clock signal remains at the first voltage level at the expiration of the first period of time. If the voltage of the data signal or the clock signal has not remained at the first voltage level at the expiration of the period of time, the method proceeds to step 914 and the IC device 402, 404 or 406 may yield control of the communications link and waits for a next arbitration phase at step 916. Yielding control of the communications link may include yielding control of the data signal and a clock signal associated with the communications link.

If at step 906 it was determined that the voltage of the data signal and the clock signal remains at the first voltage level at the expiration of the first period of time, the method proceeds to step 908. At step 910, the IC device 402, 404 or 406 may assert control over the communications link by driving the data signal to a second voltage level. Asserting control of the communications link may include controlling the data signal and a clock signal associated with the communications link.

At step 912, the IC device 402, 404 or 406 may transmit a message on the communications after asserting control of the communications link.

Figure 10:
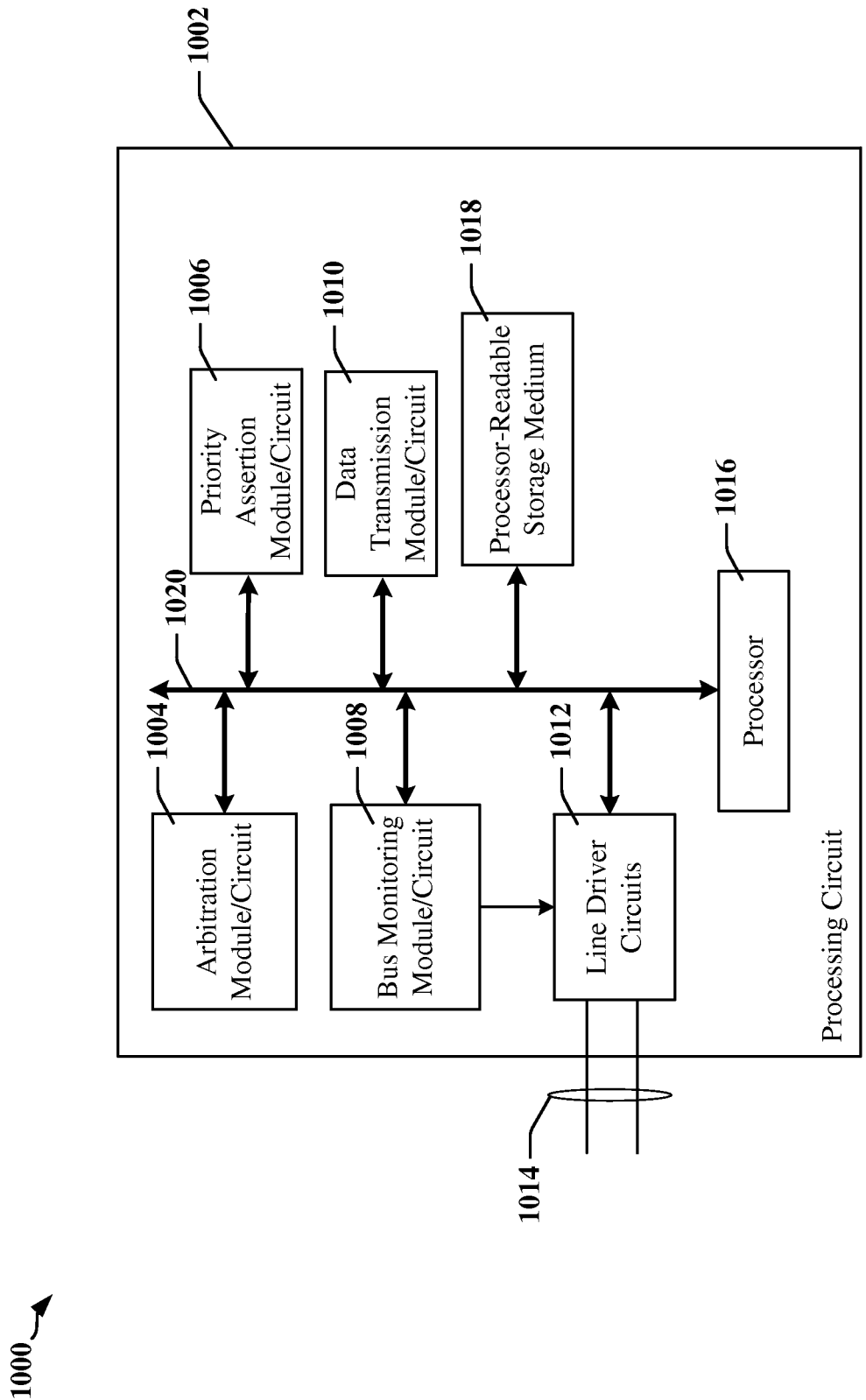
FIG. 10 is a diagram illustrating a simplified example of a hardware implementation of an apparatus connected to an MP-CxMi bus.

FIG. 10 is a diagram 1000 illustrating a simplified example of a hardware implementation of an apparatus connected to a CxMi bus and employing a processing circuit 1002. In one example, the apparatus may include one or more IC devices 402, 404 and/or 406 (see FIG. 4) equipped with components, modules or circuits such as CxMi gateways 420, 440, 460, which may be used for data encoding, formatting and/or transmitting data. One or more instances or variants of the processing circuit 1002 may be deployed in the apparatus 400 and/or in one or more of the IC devices 402, 404 and/or 406. The processing circuit 1002 may be implemented with a bus architecture, represented generally by the bus 1020. The bus 1020 may include any number of interconnecting buses and bridges depending on the specific application of the processing circuit 1002 and the overall design constraints. The bus 1020 links together various circuits including one or more processors and/or hardware modules, represented by the processor 1016, the modules or circuits 1004, 1006, 1008 and 1010, line drivers 1012 configurable to drive connectors or wires 1014 and the computer-readable storage medium 1018. The bus 1020 may also link various other circuits such as timing sources, peripherals, voltage regulators, and power management circuits, which are well known in the art, and therefore, will not be described any further.

The processor 1016 may include a microprocessor, a controller, a digital signal processor, a sequencer, a state machine, etc. The processor 1016 is responsible for general processing, including the execution of software stored on the computer-readable storage medium 1016. The software, when executed by the processor 1016, causes the processing circuit 1002 to perform the various functions described supra for any particular apparatus. The computer-readable storage medium 1018 may also be used for storing data that is manipulated by the processor 1016 when executing software. The processing circuit 1002 further includes at least one of the modules 1004, 1006, 1008 and 1010. Certain modules 1004, 1006, 1008 and/or 1010 may be software modules running in the processor 1016, resident/stored in the computer readable storage medium 1018, one or more hardware modules coupled to the processor 1016, or some combination thereof.

In one configuration, the apparatus in the diagram 1000 includes means 1004, 1006, 1012 for contending for control of a communications link by driving a data signal to a first voltage level, means 1008, 1012 for monitoring the data signal and a clock signal for a period of time, means 1004, 1006, 1012 for yielding control of the communications link if the voltage of the data signal or the clock signal is not at the first voltage level at the expiration of the first period of time, means 1004, 1006, 1012 for asserting control over the communications link 1014 by driving the data signal to the second voltage level if the voltage of the data signal is at the first voltage level at the expiration of the period of time, and means 1010, 1008 and 1012 for transmitting a message on the communications after asserting control of the communications link.

The aforementioned means may be implemented, for example, using some combination of a processing circuit 226, 246, 266 and/or 282 (see FIG. 2), gateways 220, 240, 260, 280 (see FIG. 2), gateways 420, 440, 460 (see FIG. 4) and storage media 286 (see FIG. 2).

It is understood that the specific order or hierarchy of steps in the processes disclosed is an illustration of exemplary approaches. Based upon design preferences, it is understood that the specific order or hierarchy of steps in the processes may be rearranged. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method performed at a first node of a plurality of nodes in an apparatus, comprising:
   contending for control of a communications link by asserting a first logic state on a data signal transmitted on a first wire of the communications link, wherein the first logic state is asserted by driving the first wire to a first voltage level;
   monitoring the data signal and a clock signal for a first period of time, wherein the first wire remains at the first voltage level until one of the plurality of nodes asserts a second logic state on the data signal;
   yielding control of the communications link if the data signal has transitioned to the second logic state before expiration of the first period of time, wherein the first wire is at a second voltage level different from the first voltage level when the data signal is in the second logic state, and wherein the data signal transitions to the second logic state when the first wire is driven to the second voltage level by a second node of the plurality of nodes;
   asserting control over the communications link by asserting the second logic state on the data signal if the data signal has not transitioned to the second logic state before expiration of the first period of time; and
   transmitting a message using the data signal and the clock signal after asserting control over the communications link,
   wherein the first period of time has a duration corresponding to a priority of the message.

2. The method of claim 1, wherein contending for control of the communications link includes:
   determining that the data signal and the clock signal of the communications link have been idle for a second period of time before asserting the second logic state on the data signal, wherein the data signal and the clock signal remain in the second logic state when idle.

3. The method of claim 1, wherein the first period of time is determined based on a priority of the message or a priority associated with a node configured to transmit the message on the communications link, wherein the first period of time is shorter for higher priorities.

4. The method of claim 1, wherein the first period of time is defined differently for two or more nodes contending for control of the communications link.

5. The method of claim 1, wherein the first period of time is calculated as a multiple of a transmission timing unit defined for timing activities associated with the communications link, and wherein contending for control of the communications link comprises:
asserting the first logic state on the data signal for less than one transmission timing unit.

6. The method of claim 5, wherein the communications link connects nodes located on different integrated circuit devices.

7. The method of claim 6, wherein the nodes located on the different integrated circuit devices operate at different internal clock rates, and wherein the transmission timing unit is equal to or greater than a clock period of a slowest of the internal clock rates.

8. The method of claim 1, wherein the first period of time is calculated as a weighted sum of the priority of the message and an address of a node configured to transmit the message on the communications link, and wherein the first period of time is shorter for higher priority messages or higher priority nodes.

9. The method of claim 1, wherein monitoring the data signal for the first period of time includes causing a node configured to transmit the message on the communications link to enter a high impedance state.

10. The method of claim 1, wherein control of the communications link comprises control of the data signal and the clock signal.

11. An apparatus, comprising:
means for contending for control of a communications link by asserting a first logic state on a data signal transmitted on a first wire of the communications link, wherein the first logic state is asserted by driving the first wire to a first voltage level;
means for monitoring the data signal and a clock signal for a first period of time, wherein the first wire remains at the first voltage level until one of a plurality of nodes coupled to the communications link asserts a second logic state on the data signal;
means for yielding control of the communications link if the data signal has transitioned to the second logic state before expiration of the first period of time, wherein the first wire is at a second voltage level different from the first voltage level when the data signal is in the second logic state, and wherein the data signal transitions to the second logic state when the first wire is driven to the second voltage level by a second node of the plurality of nodes;
means for asserting control over the communications link by asserting the second logic state on the data signal if the data signal has not transitioned to the second logic state before expiration of the first period of time; and
means for transmitting a message using the data signal and the clock signal after asserting control over the communications link,
wherein the first period of time has a duration corresponding to a priority of the message.

12. The apparatus of claim 11, wherein the means for contending for control of the communications link is configured to determine that the data signal and the clock signal of the communications link have been idle for a second period of time before asserting the second logic state on the data signal, wherein the data signal and the clock signal remain in the second logic state when idle.

13. The apparatus of claim 11, wherein the first period of time is determined based on a priority of the message or a priority associated with a node configured to transmit the message on the communications link, wherein the first period of time is shorter for higher priorities.

14. The apparatus of claim 11, wherein the first period of time is defined differently for two or more nodes contending for control of the communications link.

15. The apparatus of claim 11, wherein the first period of time is calculated as a multiple of a transmission timing unit defined for timing activities associated with the communications link, and wherein the means for contending for control of the communications link is configured to assert the first logic state on the data signal for less than one transmission timing unit.

16. The apparatus of claim 15, wherein the communications link connects nodes located on different integrated circuit devices.

17. The apparatus of claim 16, wherein the nodes located on the different integrated circuit devices operate at different internal clock rates, and wherein the transmission timing unit is equal to or greater than a clock period of a slowest of the internal clock rates.

18. The apparatus of claim 11, wherein the first period of time is calculated as a weighted sum of the priority of the message and an address of a node configured to transmit the message on the communications link, and wherein the first period of time is shorter for higher priority messages or higher priority nodes.

19. The apparatus of claim 11, wherein the means for monitoring the data signal for the first period of time is configured to cause a node configured to transmit the message on the communications link to enter a high impedance state.

20. The apparatus of claim 11, wherein control of the communications link comprises control of the data signal and the clock signal.

21. An apparatus, comprising:
a plurality of line driver circuits coupled to a pair of wires of a communications link;
a processing circuit coupled to the line driver circuits and configured to:
contend for control of the communications link by asserting a first logic state on a data signal transmitted by a first line driver circuit on a first wire of the communications link, wherein the first logic state is asserted by driving the first wire to a first voltage level;
monitor the data signal and a clock signal for a first period of time, wherein the first wire remains at the first voltage level until one of a plurality of nodes coupled to the communications link asserts a second logic state on the data signal;
yield control of the communications link if the data signal has transitioned to the second logic state before expiration of the first period of time, wherein the first wire is at a second voltage level different from the first voltage level when the data signal is in the second logic state, and wherein the data signal transitions to the second logic state when the first wire is driven to the second voltage level by a second node of the plurality of nodes;
assert control over the communications link by driving the data signal to the second voltage level if the data signal has not been driven to the second voltage level before expiration of the first period of time; and transmit a message using the data signal and the clock signal after asserting control over the communications link, wherein the first period of time has a duration corresponding to a priority of the message.

22. The apparatus of claim 21, wherein the processing circuit is configured to determine that the data signal and the clock signal of the communications link have been idle for a second period of time before asserting the second logic state on the data signal, wherein the data signal and the clock signal remain in the second logic state when idle.

23. The apparatus of claim 21, wherein the first period of time is determined based on a priority of the message or a priority associated with a node configured to transmit the message on the communications link, wherein the first period of time is shorter for higher priorities.

24. The apparatus of claim 21, wherein the first period of time is defined differently for two or more nodes contending for control of the communications link.

25. The apparatus of claim 21, wherein the first period of time is calculated as a multiple of a transmission timing unit defined for timing activities associated with the communications link, and wherein the processing circuit is configured to assert the first logic state on the data signal for less than one transmission timing unit when contending for control of the communications link.

26. The apparatus of claim 25, wherein the communications link connects nodes located on different integrated circuit devices.

27. The apparatus of claim 26, wherein the nodes located on the different integrated circuit devices operate at different internal clock rates, and wherein the transmission timing unit is equal to or greater than a clock period of a slowest of the internal clock rates.

28. The apparatus of claim 21, wherein the first period of time is calculated as a weighted sum of the priority of the message and an address of a node configured to transmit the message on the communications link, and wherein the first period of time is shorter for higher priority messages or higher priority nodes.

29. The apparatus of claim 21, wherein the processing circuit is configured to cause a node configured to transmit the message on the communications link to enter a high impedance state while monitoring the data signal for the first period of time.

30. The apparatus of claim 21, wherein control of the communications link comprises control of the data signal and the clock signal.

31. A non-transitory machine-readable storage medium having instructions stored thereon, which when executed by at least one processing circuit cause the at least one processing circuit to:

contend for control of a communications link by asserting a first logic state on a data signal transmitted on a first wire of the communications link, wherein the first logic state is asserted by driving the first wire to a first voltage level;

monitor the data signal and a clock signal for a first period of time, wherein the first wire remains at the first voltage level until one of a plurality of nodes coupled to the communications link asserts a second logic state on the data signal;

yield control of the communications link if the data signal has transitioned to the second logic state before expiration of the first period of time, wherein the first wire is at a second voltage level different from the first voltage level when the data signal is in the second logic state, and wherein the data signal transitions to the second logic state when the first wire is driven to the second voltage level by a second node of the plurality of nodes;

assert control over the communications link by asserting the second logic state on the data signal if the data signal has not transitioned to the second logic state before expiration of the first period of time; and transmit a message using the data signal and the clock signal after asserting control over the communications link, wherein the first period of time has a duration corresponding to a priority of the message.

32. The storage medium of claim 31, wherein the instructions cause the at least one processing circuit to:

determine that the data signal and the clock signal of the communications link have been idle for a second period of time before asserting the second logic state on the data signal, wherein the data signal and the clock signal remain in the second logic state when idle.

33. The storage medium of claim 31, wherein the first period of time is determined based on a priority of the message or a priority associated with a node configured to transmit the message on the communications link, wherein the first period of time is shorter for higher priorities.

34. The storage medium of claim 31, wherein the first period of time is defined differently for two or more nodes contending for control of the communications link.

35. The storage medium of claim 31, wherein the first period of time is calculated as a multiple of a transmission timing unit defined for timing activities associated with the communications link, and wherein the first logic state is asserted on the data signal for less than one transmission timing unit when the at least one processing circuit is contending for control of the communications link.

36. The storage medium of claim 35, wherein the communications link connects nodes located on different integrated circuit devices.

37. The storage medium of claim 36, wherein the nodes located on the different integrated circuit devices operate at different internal clock rates, and wherein the transmission timing unit is equal to or greater than a clock period of a slowest of the internal clock rates.

38. The storage medium of claim 31, wherein the first period of time is calculated as a weighted sum of the priority of the message and an address of a node configured to transmit the message on the communications link, and wherein the first period of time is shorter for higher priority messages or higher priority nodes.

39. The storage medium of claim 31, wherein the instructions cause the at least one processing circuit to:

cause a node configured to transmit the message on the communications link to enter a high impedance state while monitoring the data signal for the first period of time.

40. The storage medium of claim 31, wherein control of the communications link comprises control of the data signal and the clock signal.

* * * * *